United States Patent [19]

Noda

[11] Patent Number: 5,069,396

[45] Date of Patent: Dec. 3, 1991

[54] TWO-BEARING REEL

[75] Inventor: Hideo Noda, Sakai, Japan

[73] Assignee: Shimano Industrial Co., Ltd., Sakai, Japan

[21] Appl. No.: 511,265

[22] Filed: Apr. 23, 1990

[30] Foreign Application Priority Data

Apr. 22, 1989 [JP] Japan ................. 1-47536[U]

[51] Int. Cl.$^5$ .......................................... A01K 89/033
[52] U.S. Cl. .................................. 242/321; 242/261
[58] Field of Search .................. 242/261, 312, 321

[56] References Cited

U.S. PATENT DOCUMENTS

| | | | |
|---|---|---|---|
| 1,417,633 | 5/1922 | Schmid | 242/312 X |
| 2,282,995 | 5/1942 | Dumond | 242/321 X |
| 2,344,209 | 3/1944 | Lowe | 242/321 X |
| 2,355,445 | 8/1944 | Khoenle | 242/321 |
| 2,573,240 | 10/1951 | Berlinger | 242/261 X |
| 3,348,788 | 10/1967 | Vinokur | 242/321 X |
| 4,332,358 | 6/1982 | Neufeld | 242/321 |
| 4,964,590 | 10/1990 | Sato | 242/261 |

FOREIGN PATENT DOCUMENTS 57-39027  8/1981  Japan .

*Primary Examiner*—Daniel P. Stodola
*Assistant Examiner*—Charles T. Riggs, Jr.
*Attorney, Agent, or Firm*—Dickstein Shapiro Morin

[57] ABSTRACT

A two-bearing reel comprises a first side plate and a second side plate opposed to each other, a spool shaft carrying a spool and rotatably supported between the first and second side plates, the spool shaft including an extension projecting outwardly from a first bearing supported by the first side plate, a master gear driven by a handle, a pinion gear meshed with the master gear and slidably supported on the extension, and a clutch provided between the spool shaft and pinion gear. The clutch includes engaging projections provided on the spool shaft and engaging grooves provided on the pinion gear. The first bearing defines passage grooves on inside surfaces thereof perpendicular to a direction in which a load acts on the spool shaft, for allowing passage of the engaging projections therethrough.

5 Claims, 2 Drawing Sheets

TWO-BEARING REEL

BACKGROUND OF THE INVENTION

1. Field of the Invention

This invention relates to two-bearing reels.

2. Description of the Prior Art

A known reel of this type, as shown in Japanese Utility Model Publication No. 57-39027, comprises a first side plate, a second side plate, and a spool shaft rotatably supported by the two side plates through bearings, the spool shaft having one end extending outwardly of the first side plate disposed adjacent a handle. This outward extension carries a pinion gear to be rotatable and axially slidable, which pinion gear is meshed with a master gear driven by the handle. The pinion gear has an end face opposed to the first side plate and defining an elliptic clutch opening having parallel dihedrals or widths across flats. The spool shaft defines a clutch barrel having dihedrals engageable with this clutch opening. A torque produced by operating the handle is transmitted to the spool through engagement between clutch barrel and clutch opening, while the spool is made freely rotatable when the engagement therebetween is broken.

The known construction noted above is capable of minimizing deflection of the spool shaft between the first and second side plates, and of carrying out the clutching function for making and breaking the torque transmission. However, the bending stress of the spool shaft tends to concentrate on the clutch barrel since the clutch barrel has parallel dihedrals or width across flats formed by cutting peripheral surfaces of the spool shaft so that the clutch barrel has a substantially reduced sectional area compared with an adjacent sectional area. Thus, when a great reaction force acts on the teeth of the master gear and pinion gear with engagement of the two gears, the spool shaft becomes deformed which could impair the engagement between the two gears.

Japanese Patent Publication No. 50-21392, for example, shows a different reel which has no such drawback relating to the spool shaft. According to this publication, the spool shaft includes a pin projecting diametrically outwardly therefrom, and the pinion gear defines slot (or engaging grooves) for engagement with the pin. Torque transmission between the pinion gear and spool shaft is made or broken by engaging and disengaging the pin and slot.

In fishing, generally, a suitable fishing line is selected according to the type or size of fish to be caught. It is desirable to change fishing lines as wound on respective spools. The spool shaft normally is removably inserted through the second side plate toward the first side plate because the first side plate has a complicated construction with a drive mechanism including the master gear driven by a handle operation and the pinion gear for meshing with the master gear.

Of the two known constructions noted above, the latter has the advantage of increased strength of the spool shaft over the former. However, if in the latter construction the spool shaft rotatably supported by the first and second side plates were removable through the second side plate, the pin projecting from peripheries of the spool shaft would be blocked by an end face of the bearing fixed to the first side plate and unable to pass through the axial bore of the bearing. Therefore, the spool fixedly mounted on the spool shaft would not be readily removable from the reel. This poses a problem that the spool is not easily interchangeable for changing fishing lines.

SUMMARY OF THE INVENTION

The present invention has been made having regard to the disadvantages of the prior art noted above. An object of the invention is, therefore, to provide a two-bearing reel having a spool supported between a first side plate and a second side plate, which has a simple construction without reducing the strength of the spool shaft and which allows the spool to be removed easily, without obstruction by the bearings of the spool shaft, to be replaced with one carrying a fishing line suited for a particular fishing situation.

In order to achieve the above object, a two-bearing reel according to the present invention comprises a first side plate and a second side plate opposed to each other, a spool shaft carrying a spool and rotatably supported between the first and second side plates, the spool shaft including an extension projecting outwardly from a first bearing supported by the first side plate, a master gear driven by a handle, a pinion gear meshed with the master gear and slidably supported on the extension, and a clutch provided between the spool shaft and pinion gear. The clutch includes engaging projections provided on the spool shaft and engaging grooves provided on the pinion gear. The first bearing defines passage grooves on inside surfaces thereof perpendicular to a direction in which a load acts on the spool shaft, for allowing passage of the engaging projections therethrough.

In the reel as constructed above, the spool shaft undergoes little deflection between the first and second side plates since the spool shaft is rotatably supported by and between the two side plates. Further, since the engaging projections and grooves constitute a clutch for transmitting rotation of the pinion gear to the spool shaft, the spool shaft need not define a clutch barrel with dihedrals or width across flats as in the prior art. This construction has the advantages of avoiding a stress concentration on the spool shaft, and allowing the inner periphery of the pinion gear to have a uniformly reduced diameter. Further, since the first bearing supported by the first side plate defines the passage grooves in its inner periphery to be perpendicular to the load acting direction of the spool shaft for allowing passage of the engaging projections provided on the spool shaft, the spool shaft carrying the engaging projections on its outer periphery is removable with ease by merely placing the engaging projections in register with the passage grooves and passing the projections through the first bearing. The passage grooves are disposed at the positions where the load acting on the spool shaft is less effective, thereby avoiding an increase in the rate of wear due to the reduction in the area of contact between the first bearing and spool shaft resulting from the presence of the passage grooves.

The two-bearing reel according to the present invention, as described above, minimizes the deflection of the spool shaft between the opposite first and second side plates since the spool shaft is rotatably supported by the side plates, and does not reduce the strength of the spool shaft since the clutch for transmitting the operating force of the master gear from the pinion gear to the spool shaft comprises the engaging projections extending radially of the spool shaft and engaging grooves defined in the pinion gear. Moreover, in the construction in which the first bearing supported by the first side plate defines the passage grooves in its inner periphery perpendicular to the load acting direction of the spool shaft for allowing passage of the engaging projections, the spool shaft is removable through the second side plate with ease without being obstructed by the bearing. This two-bearing reel has a simple and inexpensive construction though allowing the spool shaft to be removably mounted therein. In addition, although the passage grooves are defined in the inner periphery of the first bearing which results in a reduction in the area of contact between the first bearing and spool shaft, an increase in the rate of wear due to the contact area reduction is avoided by arranging the passage grooves at positions perpendicular to the load acting direction of the spool shaft.

Other objects, features and advantages of the present invention will be apparent from the following description.

DETAILED DESCRIPTION OF THE PREFERRED EMBODIMENT

A two-bearing reel embodying the present invention will be described in detail hereinafter with reference to the drawings.

Figure 1:
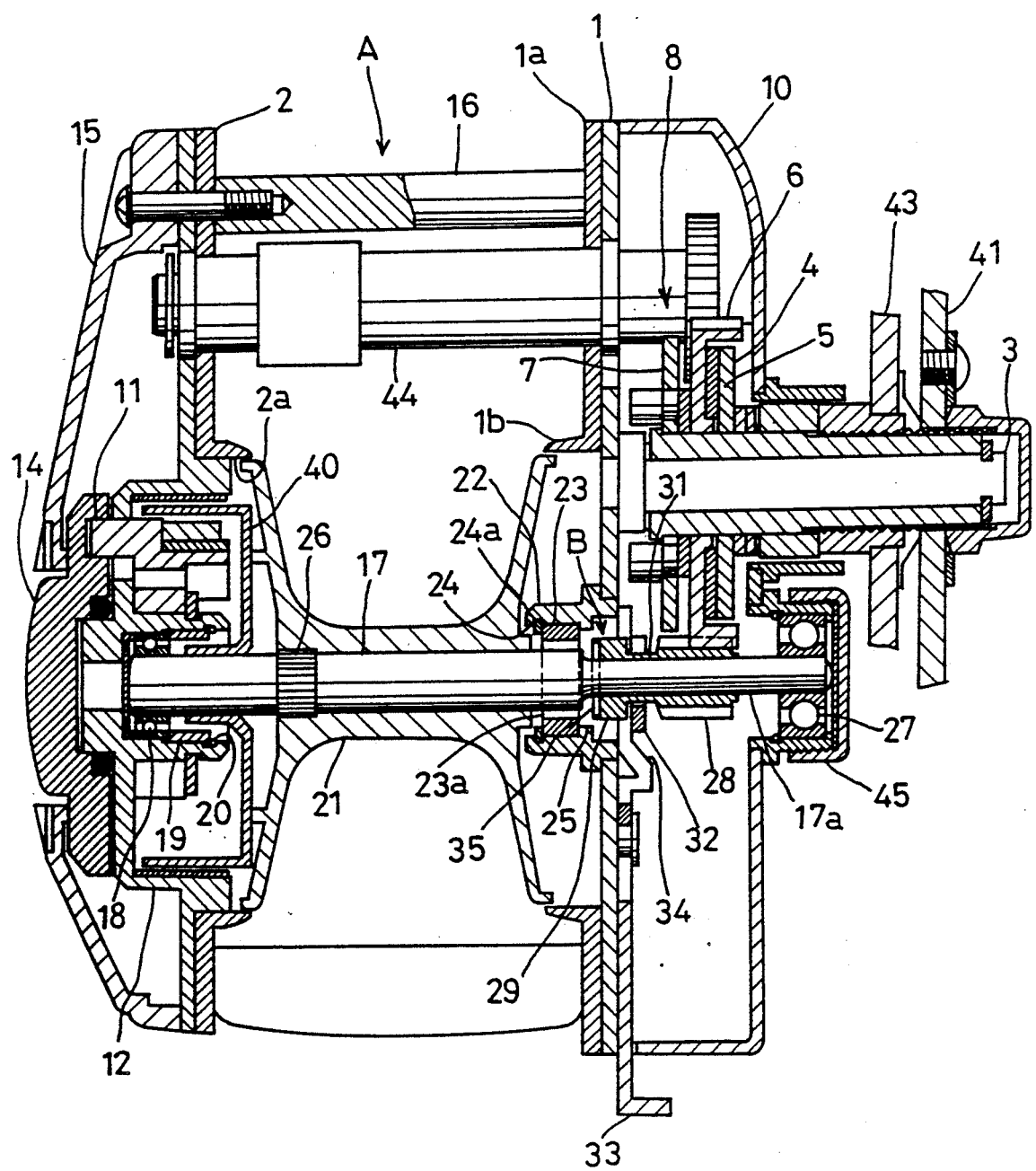
FIG. 1 is a sectional front view of a two-bearing reel according to the present invention.

Referring to FIG. 1, the reel comprises a first side plate 1 and a second side plate 2 opposed to each other. A mechanical housing 10 containing a drive mechanism 8 is provided outwardly of the first side plate 1. The drive mechanism 8 includes a disk 4, a friction plate 5, a master gear 6 and a return plate 7 supported on a handle shaft 3. The second side plate 2 has a brake case 12 supporting a magnet brake mechanism 11. An outer housing 15 is provided outwardly of the brake case, with a control knob 14 exposed through an opening of the outer housing 15 for controlling the magnet brake mechanism 11. A doubling plate 1a is provided on an inside surface of the first side plate 1. Tubular portions 1b and 2a project inwardly from the doubling plate 1a and the second side plate 2, respectively, for loosely engaging outer peripheries of flanges formed on opposite ends of a spool 21 to be described later. Connecting rods 16 extend between the doubling plate 1a and second side plate 2. These connecting rods 16 maintain a spacing between the two side plates 1 and 2 to define a reel body A. The spool 21 is mounted on a spool shaft 17 supported at one end thereof by a bearing 18 fitted in an inside peripheral wall of the brake case 12. The spool shaft 17 is locked against axial movement by a collar 19 and a stopper ring 20.

Figure 2:
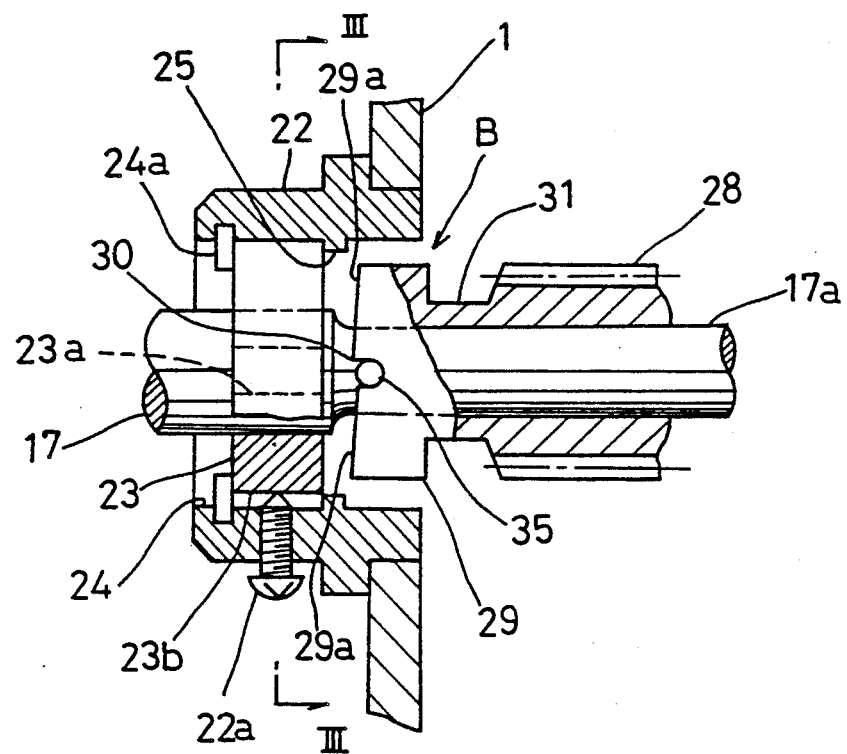
FIG. 2 is a an enlarged sectional view of a principal portion of the reel.
Figure 3:
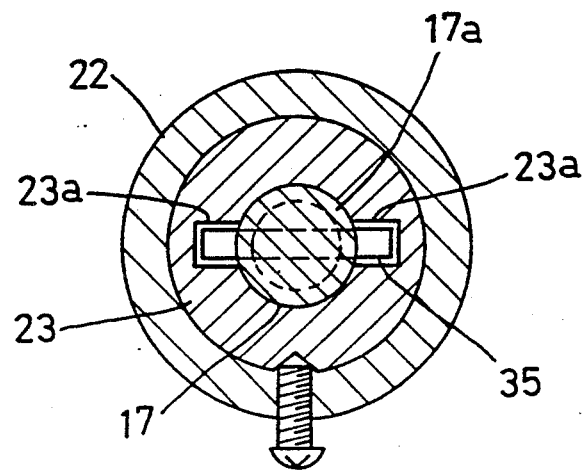
FIG. 3 is a section taken on line III—III of FIG. 2.

As shown in FIGS. 2 and 3, a tubular bearing holder 22 is secured to an inside wall of the first side plate 1 for supporting a first bearing 23 in its inside surface 24. The inside surface 24 includes a stepped constriction 25 and a stopper 24a for preventing axial movement of the first bearing 23. The tubular wall of the bearing holder 22 defines a threaded bore extending from outer periphery to inner periphery, and a set bolt acting as a fixing device extends through the threaded bore.

The first bearing 23 has a bush-like thick-walled annular construction formed of a metallic or plastic material. As shown in FIG. 3, the first bearing 23 has the outer periphery held by the inside surface of the bearing holder 22, and the inner periphery defining opposite passage grooves 23a of sufficient width and depth for allowing passage of engaging projections 35 described later. The outer periphery of the first bearing 23 defines a rotation limiting groove 23b for engaging a tip end of the set bolt 22a. When the fishing line is taken up on the spool 21 through a line guide, a load acts on the spool shaft 17 in a direction perpendicular to a line linking a centerline of rotation of the master gear 6 and a centerline of rotation of a pinion gear 28 mounted at an end of the spool shaft 17. The rotation limiting groove 23b is defined in a position to set the above load acting direction perpendicular to the passage grooves 23a defined in the inner periphery of the first bearing 23.

The spool 21 on which the fishing line is wound is rigidly connected to the spool shaft 17 by a fixing device 26. The spool shaft 17 is rotatably supported at one end thereof by the second side plate 2 through the bearing 18. The other end of the spool shaft 17 is rotatably supported by the first side plate 1 through the first bearing 23. The spool shaft 17 includes an outward extension 17a extending outwardly of the first bearing 23. This outward extension 17a has an extreme end thereof axially movably supported by a bearing 27 mounted in the mechanical housing 10. The pinion gear 28 is mounted on the outward extension 17a of the spool shaft 17 between the first bearing 23 and bearing 27 to be rotatable and axially slidable for meshing with the master gear 6.

The pinion gear 28 includes a tubular clutch boss 29 formed integral therewith at a position opposed to the spool 21. The clutch boss 29 has the same diameter as an addendum circle of the pinion gear 28, which is smaller than the stepped constriction of the inside surface 24 of the bearing holder 22. The boss 29 defines engaging radial grooves 30 formed on an end face thereof opposed to the spool 21 and extending diametrically opposite from the axis of the boss 29. Further, a peripheral groove 31 is formed between the clutch boss 29 and pinion gear 28 for receiving a clutch yoke 32 supported by the first side plate 1. The clutch yoke 32 is operable through a side face thereof by a contact piece 34 of a clutch lever 33 including a control portion extending outwardly of the mechanical housing 10. The end face of the clutch boss 29 further defines guide surfaces 29a displaced axially outwardly in the circumferential direction from edges of the engaging grooves 30, respectively.

The extension 17a of the spool shaft 17 fixedly carries an engaging pin extending therethrough at a position opposed to the engaging grooves 30 of the clutch boss 29. This pin has a thickness fitting with the engaging grooves 30, and defines engaging projections 35 which do not extend outwardly of the periphery of the clutch boss 29.

Numeral 40 in FIG. 1 denotes a tubular conductor acting as the magnet brake mechanism 11. Numeral 41 denotes a handle for applying a torque to the drive mechanism 8. Numeral 43 denotes an adjuster for adjusting a drag mechanism including the friction plate 5 and disk 4. Numeral 44 denotes a guide shaft for moving a guide element (not shown) when the fishing line is taken up on the spool 21. Numeral 45 denotes a cast control.

The way in which the two-bearing reel as constructed above operates will be described next.

To start fishing, the user operates the clutch lever 33 projecting from the mechanical housing 10 to disengage the projections 35 formed on the spool shaft 17 from the grooves 30 of the clutch boss 29 by means of the clutch yoke 32, thereby placing the spool 21 in a freely rotatable state, and casts the fishing line to an intended location on water surface.

When a fish takes the bait, the user turns the handle 41 in the direction to take up the line, whereby the clutch lever 33 is automatically restored by the return plate 7 to engage the projections 35 and grooves 30. Then the torque of the handle 41 is transmitted to the spool 21 through the engagement between the master gear 6 of the drive mechanism 8 and the pinion gear 28 on spool shaft 17, thereby taking up the fishing line.

When the user wishes to catch a different type or size of fish, he or she may change the line wound on the spool 21 for a fishing line suited for the desired fish type or size. In this case, the device rigidly connecting the outer housing 15 to the reel body A is released to remove the outer housing 15 and the brake case 12 along with the magnet brake mechanism 11 and bearing 18 as mounted therein. Subsequently, the tubular conductor 40 and spool 21 fixed to the spool shaft 17 are pulled out together through the tubular portion 2a of the second side plate 2. At this time, the spool 21 and spool shaft 17 rigidly connected to each other are removable with ease, since the first bearing 23 defines the passage grooves 23a in its inner periphery, by merely placing the engaging projections 35 in register with the passage grooves 23a of the first bearing 23. Further, the first bearing 23 defines the rotation limiting groove 23b on its outer periphery for preventing the bearing 23 from rotating relative to the inside surface 24 of the bearing holder 22. The free rotation of the first bearing 23 is stopped by the set bolt 22a inserted from outside the bearing holder 22 to engage the limiting groove 23b. At the same time, this engagement serves to lock the bearing 23 against rotation so that the passage grooves 23a defined inside the bearing 23 are set to the position perpendicular to the direction in which the load acts on the spool shaft 17.

The clutch B formed of the engaging projections 35 and grooves 30 may be manufactured by a simplified process. Further, the spool shaft 17 need not define dihedrals or widths across flats as in the prior art, and is therefore free from a stress concentration.

When assembling the spool having a desired fishing line wound thereon to the reel, a sequence opposite to the removing sequence is followed. That is, the spool shaft 17 carrying the spool 21 and tubular conductor 40 is inserted through the tubular portion 2a of the second side plate 2, and moved inwardly to an appropriate position only by passing the engaging projections 35 through the passage grooves of the first bearing 23. Thereafter the bearing 18 in the brake case 12 is fitted on the end of the spool shaft 17. Then the outer housing 15 and the brake case containing the magnet brake mechanism 11 are secured in position by means of the connecting device to complete the series of spool changing steps.

What is claimed is:

1. A two-bearing reel comprising:
    a first side plate (1) and a second side plate (2) opposed to each other,
    a spool shaft (17) carrying a spool (21) and rotatably supported between said first and second side plates (1, 2), said spool shaft (17) including an extension (17a) projecting outwardly from a first bearing (23) supported by said first side plate (1),
    a master gear (6) driven by a handle (41),
    a pinion gear (28) meshed with said master gear (6) and slidably supported on said extension (17a), and
    a clutch (B) provided between said spool shaft (17) and said pinion gear (28),
    wherein said clutch (B) includes engaging projections (35) provided on said spool shaft (17) and engaging grooves (30) provided on said pinion gear (28),
    wherein said first bearing (23) defines passage grooves (23a) on inside surfaces thereof for allowing passage of said engaging projections (35) therethrough, said first bearing (23) being arranged such that said passage grooves (23a) are perpendicular to a direction in which a load acts on said spool shaft (17), and
    wherein said first bearing (23) includes rotation limiting means (23b) on an outer periphery thereof, and said reel further includes a fixing device (22a) which engages said rotation limiting means (23b) to prevent rotation of said first bearing (23) and to thereby maintain said passage grooves (23a) perpendicular to the direction in which the load acts on said spool shaft (17).

2. A two-bearing reel as claimed in claim 1, wherein said first bearing (23) has a bush construction.

3. A two-bearing reel as claimed in claim 1, wherein said rotation limiting means (23b) comprises a rotation limiting groove (23b).

4. A two-bearing reel as claimed in claim 3, wherein said fixing device (22a) comprises a set bolt.

5. A two-bearing reel as claimed in claim 1, wherein said pinion gear (28) includes a clutch boss (29) at an end thereof opposed to said spool (21), said clutch boss (29) being of equal diameter to an addendum circle of said pinion gear (28).

* * * * *